(12) United States Patent
Otsuka

(10) Patent No.: US 7,061,249 B2
(45) Date of Patent: Jun. 13, 2006

(54) SEALED CONDITION INSPECTING DEVICE

(75) Inventor: Yuzo Otsuka, Tokyo (JP)

(73) Assignee: Tetra Laval Holdings & Finance S.A. (CH)

( * ) Notice: Subject to any disclaimer, the term of this patent is extended or adjusted under 35 U.S.C. 154(b) by 0 days.

(21) Appl. No.: 10/499,067

(22) PCT Filed: Dec. 26, 2002

(86) PCT No.: PCT/JP02/13605

§ 371 (c)(1),
(2), (4) Date: Jun. 17, 2004

(87) PCT Pub. No.: WO03/056290

PCT Pub. Date: Jul. 10, 2003

(65) Prior Publication Data

US 2005/0104599 A1 May 19, 2005

(30) Foreign Application Priority Data

Dec. 27, 2001 (JP) .............................. 2001-397218

(51) Int. Cl.
*G01R 31/08* (2006.01)
*G01M 3/00* (2006.01)
*G01M 3/34* (2006.01)

(52) U.S. Cl. .................... 324/522; 324/519; 73/52; 73/49.3

(58) Field of Classification Search .............. 324/519, 324/522, 659, 658; 73/52, 49.2, 49.3, 49.8
See application file for complete search history.

(56) References Cited

U.S. PATENT DOCUMENTS

| | | | | |
|---|---|---|---|---|
| 3,663,955 A | * | 5/1972 | Shimizu | 324/658 |
| 3,900,370 A | * | 8/1975 | Germscheid et al. | 205/204 |
| 4,243,932 A | * | 1/1981 | Kakumoto et al. | 324/557 |
| 5,760,295 A | * | 6/1998 | Yasumoto | 73/49.3 |
| 6,179,297 B1 | * | 1/2001 | Bauman et al. | 277/437 |
| 6,675,633 B1 | * | 1/2004 | Cramer | 73/49.3 |

* cited by examiner

*Primary Examiner*—Anjan Deb
*Assistant Examiner*—Jeff Natalini
(74) *Attorney, Agent, or Firm*—Bacon & Thomas

(57) ABSTRACT

An object of the present invention is to provide a seal condition inspection apparatus capable of reliably inspecting seal condition. The seal condition inspection apparatus includes an electrically-variable-quantity detecting section for detecting an electrically variable quantity at a portion (F) to be inspected for seal condition; a seal condition indicator value calculation processing means for calculating, on the basis of the electrically variable quantity, a seal condition indicator value indicative of seal condition of the portion (F) to be inspected; and a seal condition judgment processing means for judging from the seal condition indicator value whether seal condition is good or defective. In this case, the seal condition indicator value of the portion (F) to be inspected is calculated on the basis of the electrically variable value of the portion (F) to be inspected, and whether seal condition is good or defective is judged on the basis of the seal condition indicator value. Therefore, occurrence of a seal defect can be judged without involvement of an operator's subjectivity. As a result, seal condition can be reliably inspected.

8 Claims, 4 Drawing Sheets

SEALED CONDITION INSPECTING DEVICE

CROSS-REFERENCE TO RELATED APPLICATIONS

This application is a National Phase Application (35 USC 371) of PCT/JP02/13605 and claims priority of Japanese Application No. 2001-397218, filed Dec. 27, 2001.

1. Technical Field

The present invention relates to a seal condition inspection apparatus.

2. Background Art

Conventionally, in production of packaging containers that contain liquid food such as milk or soft drink, a Web-like packaging material, a carton-blank-like packaging material, or the like is formed into packaging containers by means of sealing at predetermined positions through heat sealing, ultrasonic sealing, or a like method. For example, when a web-like packaging material is used, in a filling apparatus, the web-like packaging material is formed into a tubular shape; the tubular packaging material is sealed in the longitudinal direction by means of a first sealing device; while being filled with liquid food, the longitudinally sealed tubular packaging material is sealed in the lateral direction and cut at predetermined intervals by means of a second sealing device to thereby yield a pillow-like prototype container; and the prototype container is formed into a final packaging container.

Meanwhile, in order to seal the above-mentioned packaging material, the packaging material is gripped from opposite sides at a predetermined gripping pressure, and resin on the surfaces of the packaging material is melted through application of heat, thereby fusing the surfaces of the packaging material together. However, for example, when the gripping pressure is too high, molten resin is squeezed from a seal portion. As a result, the amount of resin remaining in the seal portion becomes insufficient, potentially resulting in occurrence of a seal defect. Occurrence of a seal defect causes leakage of liquid food from a packaging container or entry of air into the packaging container, with a resultant deterioration in the quality of liquid food.

Thus, an operator empties a completed packaging container of liquid food, cuts the empty packaging container open, and visually inspects a longitudinally sealed portion, or a first seal portion, as well as a laterally sealed portion, or a second seal portion, for seal condition from the inside of the packaging container.

However, the above-mentioned conventional method for inspecting seal condition involves an operator's subjective judgment about occurrence of a defect, thus failing to reliably inspect seal condition.

An object of the present invention is to solve the above-mentioned problem in the conventional method for inspecting seal condition and to provide a seal condition inspection apparatus capable of reliably inspecting seal condition.

DISCLOSURE OF THE INVENTION

To achieve the above object, a seal condition inspection apparatus of the present invention comprises an electrically-variable-quantity detecting section for detecting an electrically variable quantity at a portion to be inspected for seal condition; seal condition indicator value calculation processing means for calculating, on the basis of the electrically variable quantity, a seal condition indicator value indicative of seal condition of the portion to be inspected; and seal condition judgment processing means for judging from the seal condition indicator value whether seal condition is good or defective.

In this case, the seal condition indicator value of the portion to be inspected is calculated on the basis of the electrically variable value of the portion to be inspected, and whether seal condition is good or defective is judged on the basis of the seal condition indicator value.

Therefore, occurrence of a seal defect can be judged without involvement of an operator's subjectivity. As a result, seal condition can be reliably inspected.

In another seal condition inspection apparatus of the present invention, the seal condition indicator value is the capacitance of the portion to be inspected.

In a further seal condition inspection apparatus of the present invention, the seal condition indicator value is the loss factor of the portion to be inspected.

In still another seal condition inspection apparatus of the present invention, the seal condition indicator value is the capacitance and loss factor of the portion to be inspected.

In a still further seal condition inspection apparatus of the present invention, the electrically-variable quantity is voltage applied to the portion to be inspected and current flowing through the portion to be inspected.

Yet another seal condition inspection apparatus of the present invention further comprises a phase separating section for detecting, on the basis of current flowing through the portion to be inspected, an in-phase component having the same phase as that of voltage applied to the portion to be inspected, and an out-of-phase component having a phase different from that of voltage applied to the portion to be inspected.

BEST MODE FOR CARRYING OUT THE INVENTION

An embodiment of the present invention will next be described in detail with reference to the drawings. The present embodiment will be described while mentioning a seal condition inspection apparatus for detecting the seal condition of a brick-like packaging container. However, the present invention can be applied to a seal condition inspection apparatus for detecting the seal condition of another-type of packaging container.

Figure 1:
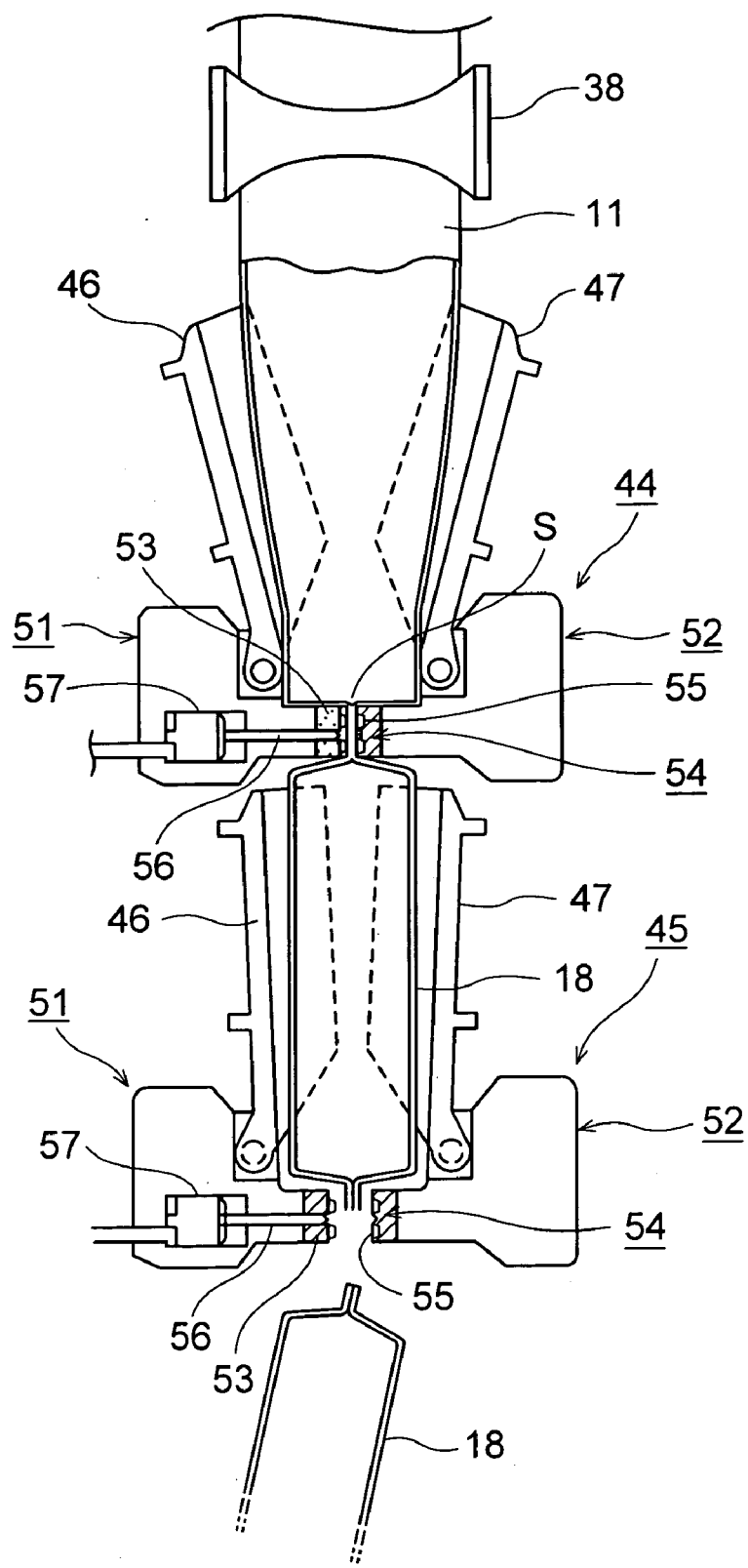
FIG. 1 is a schematic view showing a main portion of a filling apparatus in an embodiment of the present invention.

FIG. 1 is a schematic view showing a main portion of a filling apparatus according to the embodiment of the present invention.

A web-like packaging material produced by an unillustrated packaging-material production machine is set on an unillustrated delivery unit of a filling apparatus, delivered by means of the delivery unit, and caused to travel through the filling apparatus by means of a feeder.

While the packaging material is traveling, an unillustrated hole is punched in the packaging material, and an unillustrated inner tape and an unillustrated pull tab are affixed to the packaging material in such a manner as to cover the punched hole. Subsequently, the packaging material is caused to travel vertically. While being guided by means of a plurality of unillustrated forming rings disposed along the traveling direction, the vertically traveling packaging material is formed into a tubular shape. The tubular packaging material is sealed in the longitudinal direction by means of an unillustrated first sealing device to thereby become a packaging-material tube 11.

Subsequently, liquid food is supplied from above into the packaging-material tube 11 via an unillustrated filling pipe. Next, first and second sealing jaw devices 44 and 45, which constitute a second sealing device, grip the packaging-material tube 11 from opposite sides. The packaging-material tube 11 is laterally sealed at predetermined longitudinal intervals and is formed into a pillow-like prototype container 18 through deformation effected by means of forming flaps 46 and 47.

Each of the first and second sealing jaw devices 44 and 45 has a cutting jaw 51 and a heat seal jaw 52. In this case, while the packaging-material tube 11 is fed downward in an intermittent manner, the first and second sealing jaw devices 44 and 45 of the same structure are alternatingly operated such that their operating cycles are shifted from each other by half cycle, thereby enhancing the processing speed of the filling apparatus.

The cutting jaw 51 has a cutting bar 53 provided at the front end (at the right-hand end in FIG. 1); the heat seal jaw 52 has a seal block (an inductor insulator) 54 provided at the front end (at the left-hand end in FIG. 1); and the seal block 54 has two inductors 55. The cutting jaw 51 and the heat seal jaw 52 are caused to advance so as to grip the packaging-material tube 11 from opposite sides by means of the cutting bar 53 and the seal block 54, whereby the facing surfaces of the packaging-material tube 11 are brought in contact with each other. The thus-gripped packaging-material tube 11 undergoes lateral sealing at the gripped portion, thereby forming a second seal portion S including two seal lines.

A laterally extending flat cutter knife 56 is provided at the center of the cutting jaw 51 in such a manner that the cutter knife 56 can advance and retract (can move rightward and leftward in FIG. 1). When the cutter knife 56 is advanced. (moved rightward in FIG. 1), the cutter knife 56 cuts the second seal portion S at an intermediate position between the two seal lines.

A cylinder 57 is disposed at the rear end (the left-hand end in FIG. 1) of the cutter knife 56 so as to advance and retreat the cutter knife 56 through supply of compressed air or the like to and release the same from the cylinder 57.

A pair of forming flaps 46 and 47 are pivotably attached to the cutting jaw 51 and the heat seal jaw 52, respectively in such a manner as to surround and guide the packaging-material tube 11, and are adapted to form the packaging-material tube 11 into a brick-like shape while guiding the packaging-material tube 11.

In FIG. 1, the first sealing jaw device 44 is at the sealing-cutting start position. At the sealing-cutting start position, the first sealing jaw device 44 causes the cutting jaw 51 and the heat seal jaw 52 to advance so as to grip the packaging-material 11 from opposite sides, whereby the facing surfaces of the packaging-material 11 are brought into contact with each other. Then, while gripping the packaging-material tube 11, the first sealing jaw device 44 moves downward. During the downward movement, the second seal portion S is formed, thereby forming the prototype container 18.

In FIG. 1, the second sealing jaw device 45 is at the sealing-cutting end position. Immediately before the second sealing jaw device 45 reaches the sealing-cutting end position, the cutter knife 56 of the second sealing jaw device 45 is caused to advance and cut the second seal portion S at an intermediate position between the two seal lines, thereby separating the prototype container 18.

When the second seal portion S is cut at an intermediate position between the two seal lines, the cutting jaw 51 and the heat seal jaw 52 of the second sealing jaw device 45 are caused to retreat and then move upward in a gyrating manner to the sealing-cutting start position. When, at the sealing-cutting start position, the second sealing jaw device 45 begins to cause the cutting jaw 51 and the heat seal jaw 52 to advance, the cutter knife 56 of the first sealing jaw device 44 advances and cuts the second seal portion S at an intermediate position between the two seal lines, thereby separating the prototype container 18.

Notably, each of the first and second sealing jaw devices 44 and 45 has an unillustrated cylinder mechanism. At the sealing-cutting start position, compressed air or the like is supplied to the cylinder mechanism in order to draw the cutting jaw 51 and the heat seal jaw 52 to each other, thereby increasing the gripping pressure for sealing.

Subsequently, each prototype container 18 undergoes folding along previously formed folding lines so as to be formed into a predetermined shape, thereby assuming the form of a brick-like packaging container which contains a predetermined amount of liquid food.

Meanwhile, the packaging material assumes a laminate structure composed of, for example, a first resin layer formed from resin such as polyethylene and serving as an inside layer, an aluminum foil layer serving as a barrier layer, a paper substrate, and a second resin layer formed from resin such as polyethylene and serving as an outside layer, which are arranged in this order from the inside toward the outside when a packaging container is formed from the packaging material. Notably, instead of the aluminum foil layer, a resin layer formed from resin such as polyester may be used as the barrier layer. Reference numeral 38 denotes a guide roller for guiding the packaging-material tube 11.

In order to seal the packaging material, the packaging material is gripped from opposite sides at a predetermined gripping pressure by means of the cutting jaw 51 and the heat seal jaw 52 and is exposed to heat or ultrasonic vibration, whereby the surfaces of the packaging material are fused together through melting of the first and second resin layers. However, for example, when the gripping pressure is too high, molten resin is squeezed from the second seal portion S. As a result, the amount of resin remaining in the second seal portion S becomes insufficient, potentially resulting in occurrence of a seal defect. Occurrence of a seal defect causes leakage of liquid food from a packaging container or entry of air into the packaging container, with a resultant deterioration in the quality of liquid food.

Thus, an operator empties a completed packaging container of liquid food, cuts the empty packaging container open, and inspects from the inside of the packaging container the first seal portion, the second seal portion S, and the like for seal condition. However, visual inspection for seal condition involves an operator's subjective judgment about occurrence of a defect, thus failing to reliably inspect seal condition.

Next will be described a seal condition inspection apparatus capable of electrically inspecting the seal portions for seal condition. Notably, since the first seal portion assumes the same structure as that of the second seal portion S, description in relation to the first seal portion is omitted.

Figure 2:
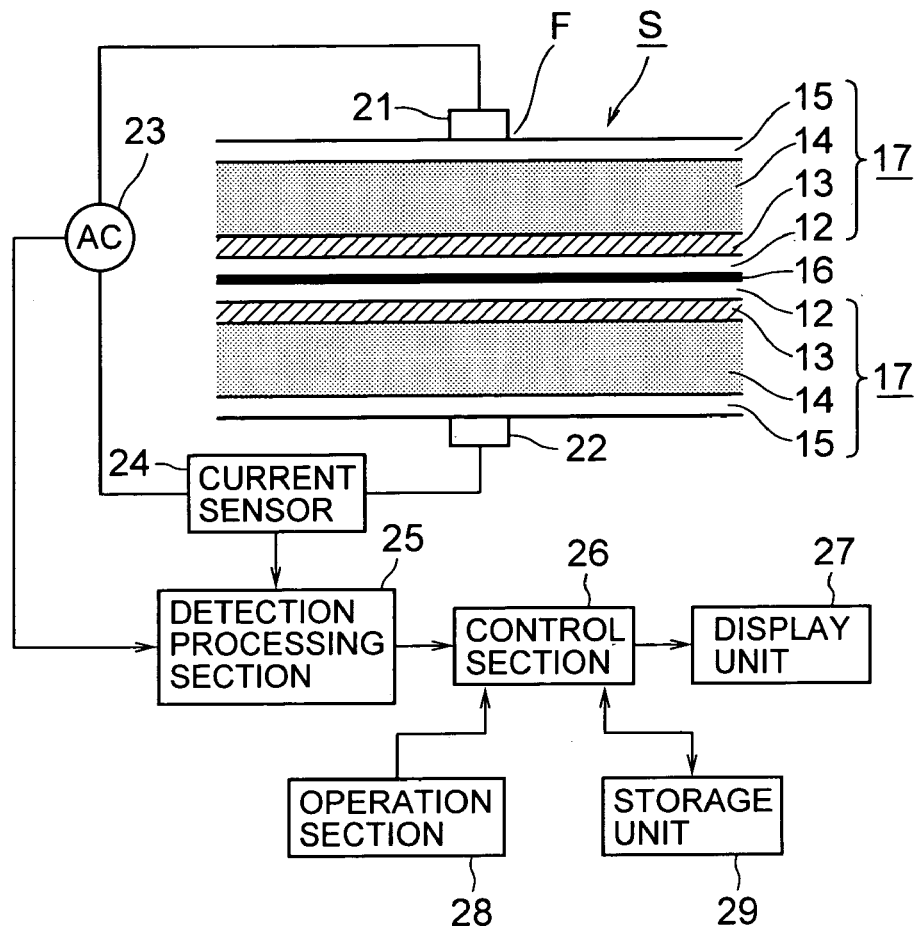
FIG. 2 is a schematic view of a seal condition inspection apparatus according to the embodiment of the present invention.
Figure 3:
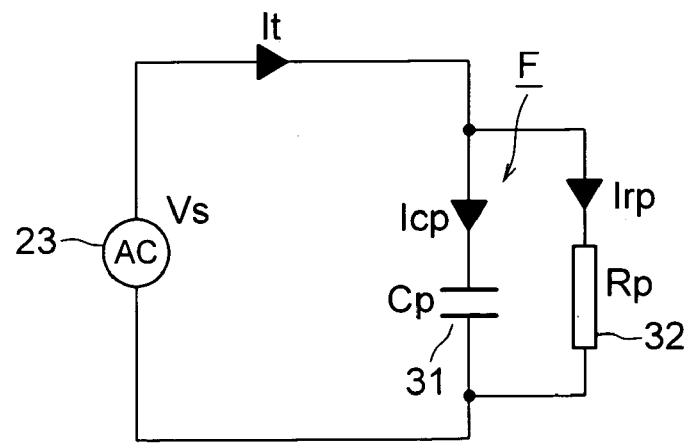
FIG. 3 is a view showing the principle of a method for inspecting seal condition according to the embodiment of the present invention.
Figure 4:
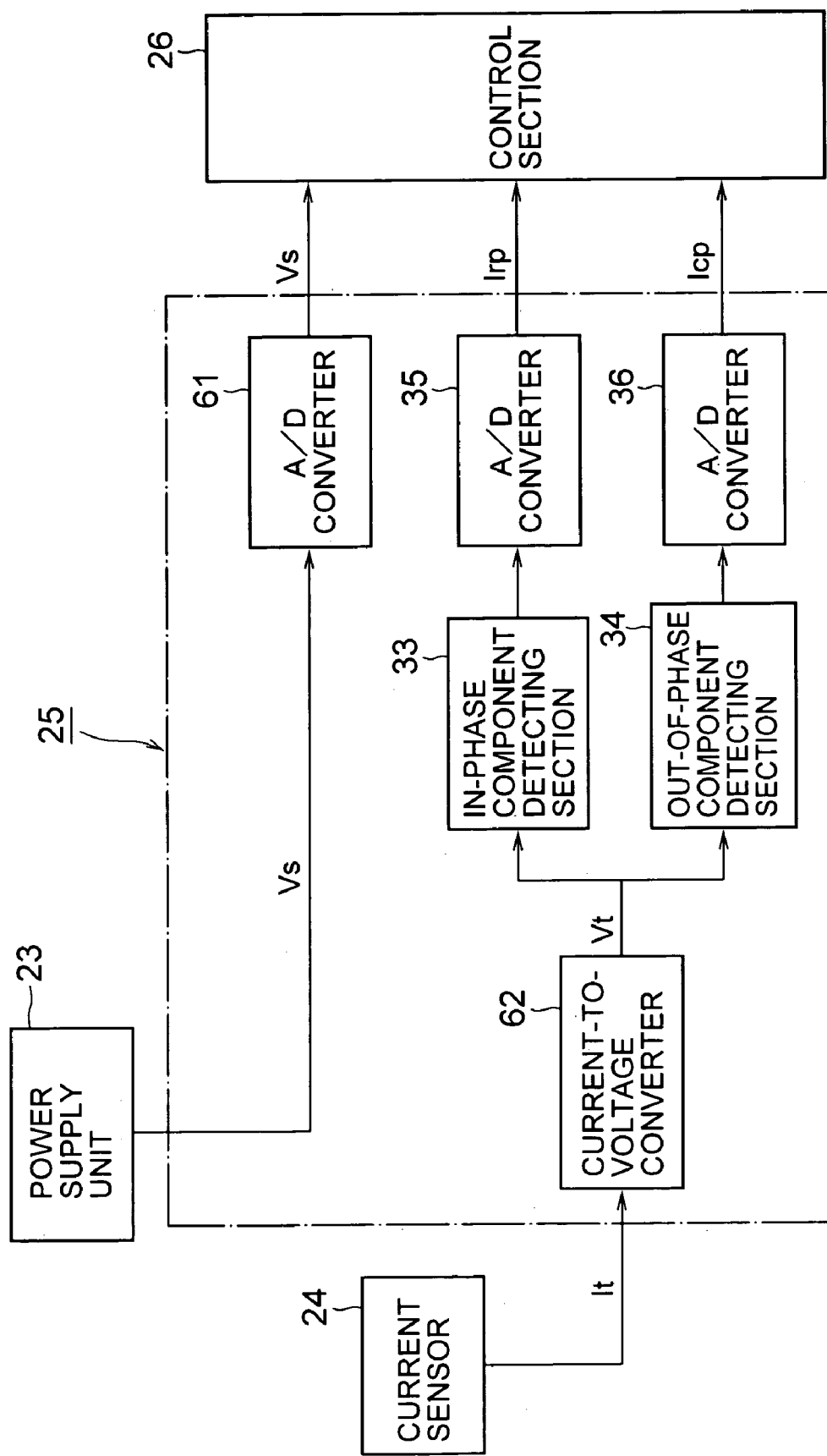
FIG. 4 is a block diagram of the seal condition inspection apparatus according to the embodiment of the present invention.
Figure 5:
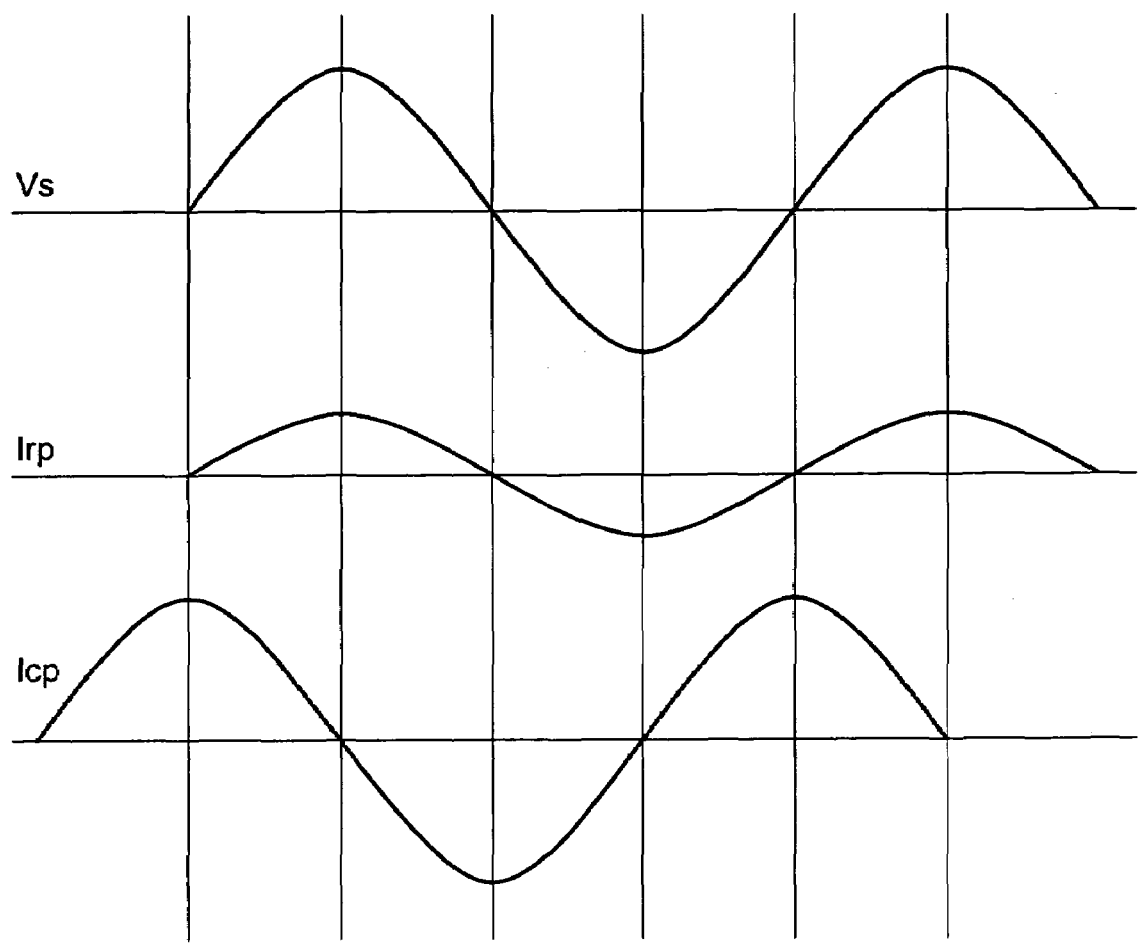
FIG. 5 is a waveform chart showing the operation of the seal condition inspection apparatus according to the embodiment of the present invention.

FIG. 2 is a schematic view of a seal condition inspection apparatus according to the embodiment of the present invention; FIG. 3 is a view showing the principle of a method for inspecting seal condition according to the embodiment of the present invention; FIG. 4 is a block diagram of the seal condition inspection apparatus according to the embodiment of the present invention; and FIG. 5 is a waveform chart showing the operation of the seal condition inspection apparatus according to the embodiment of the present invention.

In the drawings, reference symbol S denotes a second seal portion, and reference numeral 17 denotes a packaging material. The packaging material 17 includes a first resin layer 12, an aluminum foil layer 13, a paper substrate 14, and a second resin layer 15. When the packaging-material tube 11 (FIG. 1) is to be laterally sealed, the cutting jaw 51 and the heat seal jaw 52 are caused to advance so as to grip the packaging-material tube 11 from opposite sides, followed by application of heat or ultrasonic vibration. At this time, mutually facing portions of the first resin layer 12 are brought in contact with each other, and resin, for example, polyethylene used to form the first resin layer 12 melts, thereby forming a fused portion 16.

At the second seal portion S, mutually facing two portions of the packaging material 17 are layered and joined together by the fused portion 16. Since the first and second resin layers 12 and 15 and the like are formed from dielectric materials, the second seal portion S functions as a capacitor 31. When the barrier layer is formed from resin such as polyester, the barrier layer is formed from a dielectric material. An unillustrated bonding layer is formed from adhesive intervenes between the aluminum foil layer 13 and the paper substrate 14. The bonding layer is formed from a dielectric material.

The second seal portion S serves as a portion F to be inspected for seal condition. The seal condition inspection apparatus inspects the seal condition of the portion F to be inspected, on the basis of capacitance of the portion F as measured when AC current is supplied to the portion F. The capacitance serves as a first seal condition indicator value indicative of the seal condition of the portion F to be inspected.

In order to carry out the above inspection, the seal condition inspection apparatus includes two electrodes 21 and 22; a power supply unit (AC) 23, which serves as an applied-voltage generating section for generating AC voltage to be applied to the portion F to be inspected; a current sensor 24, which serves as an electrically-variable-quantity detecting section for detecting an electrically variable quantity at the portion F to be inspected; a detection processing section 25 for carrying out processing for reading voltage which is generated by the power supply unit 23, and current which is detected by the current sensor 24; a control section 26 including a CPU for controlling the entire seal condition inspection apparatus; a display unit 27 including indicator lamps and a display; an operation section 28 for carrying out various operations; and a storage unit 29 for recording predetermined data. The current sensor 24 serves as a current detecting section and detects AC current which flows through the portion F to be inspected, as the above-mentioned electrically variable quantity. According to the present embodiment, the detection processing section 25 directly reads a signal indicative of voltage generated by the power supply unit 23 to thereby detect the voltage. However, an unillustrated voltage sensor which serves as a voltage detecting section may be disposed such that the detection processing section 25 reads voltage which is detected by the voltage sensor.

The electrodes 21 and 22 are each formed from a plate of an electrically conductive material having a predetermined area and are disposed in opposition to each other. When the portion F is inspected for seal condition, the electrodes 21 and 22 are pressed against the portion F to be inspected, at a predetermined pressure such that the portion F to be inspected is sandwiched therebetween. Thus, at least one of the electrodes 21 and 22 is disposed to be advancable and retractable relative to the other (vertically movable in FIG. 2) and can be moved by means of an unillustrated moving mechanism. The electrodes 21 and 22 are connected to each other via the power supply unit 23 and the current sensor 24 and are adapted to apply to the portion F to be inspected a predetermined voltage which the power supply unit 23 generates.

Voltage to be applied to the portion F to be inspected is set according to properties of the packaging material 17; for example, according to materials and thicknesses of the first resin layer 12, aluminum foil layer 13, paper substrate 14, and second resin layer 15. When voltage is applied to the portion F to be inspected, the power supply unit 23 and the portion F to be inspected form an equivalent circuit as shown in FIG. 3. The portion F to be inspected is represented by a parallel circuit in which a capacitor 31 having a capacitance Cp and an internal resistance 32 having a resistance Rp are connected in parallel. When the capacitor 31 and the internal resistance 32 are used to represent an equivalent circuit, whether the capacitor 31 and the internal resistance 32 are connected in series or in parallel depends on the impedance of each of the capacitor 31 and the internal resistance 32. As in the case of the second seal portion S, when the impedance of the internal resistance 32 is very large in relation to the impedance of the capacitor 31, they are generally connected in parallel.

When s represents the area of each of the electrodes 21 and 22, d represents the thickness of the portion F to be inspected; i.e., the distance between load electrodes (the distance between the electrodes 21 and 22), and $\epsilon$ represents dielectric constant, the above-mentioned capacitance Cp is expressed by $$Cp = \epsilon \cdot s/d$$

In this case, the dielectric constant $\epsilon$ of the portion F to be inspected varies depending on the attributes of the packaging material 17; for example, the material and thickness of the first resin layer 12, aluminum foil layer 13, paper substrate 14, and second resin layer 15. A variation in the dielectric constant $\epsilon$ leads to a variation in the capacitance Cp at the portion F to be inspected. Particularly, the dielectric constant $\epsilon$ of the portion F to be inspected varies greatly depending on the material and thickness of layers formed from a dielectric material, such as the first and second resin layers 12 and 15 and the paper substrate 14. A great variation in the dielectric constant $\epsilon$ at the portion F to be inspected leads to a great variation in the capacitance Cp at the portion F to be inspected.

Also, the distance d between load electrodes varies depending on sealing conditions for the second seal portion S; for example, the melting temperature of resin and a gripping pressure exerted by the cutting jaw 51 and the heat seal jaw 52. A variation in the distance d between load electrodes leads to a variation in the capacitance Cp at the portion F to be inspected. For example, the higher the melting temperature or, gripping pressure, the more molten resin is squeezed sideward at the second seal portion S. Thus, the thickness of the fused portion 16 decreases accordingly. Therefore, the distance d between load electrodes decreases, and thus the capacitance Cp at the portion F to be inspected increases accordingly.

The degree of fusion of the fused portion 16 varies depending on a method for sealing the second seal portion S; i.e., a sealing method. A variation in the degree of fusion leads to a variation in the capacitance Cp at the portion F to be inspected. As for a method for sealing the second seal portion S, a block seal method and a fusion seal method are available. For example, when the block seal method is employed, fusion of resin of the first resin layer 12 is not involved. Therefore, the fused portion 16 is hardly formed, and the mutually facing portions of the first resin layer 12 are merely affixed to each other. The amount of resin at the second seal portion S does not decrease; thus, the distance d between load electrodes remain unchanged, and the capacitance Cp at the portion F to be inspected remains unchanged.

By contrast, when the fusion seal method is employed, resin of the first resin layer 12 is melted, thereby joining the mutually facing portions of the packaging material 17 together through fusion. In this case, the amount of resin at the second seal portion S decreases; thus, the distance d between load electrodes decreases, and the capacitance Cp at the portion F to be inspected increases accordingly.

Furthermore, the area of contact with the electrodes 21 and 22 varies depending on seal structure such as a seal length represented by the length of a seal line and a seal width represented by the width of the seal line in sealing the second seal portion S by means of the second sealing device. A variation in the area of contact with the electrodes 21 and 22 leads to a substantial variation in area s of the electrodes 21 and 22, and thus the capacitance Cp at the portion F to be inspected varies accordingly.

As described above, the capacitance Cp at the portion F to be inspected depends on the attributes of the packaging material 17, the sealing conditions of a sealing device, a sealing method, the structure of the sealing device, and the like. Thus, the capacitance Cp can be used as an indicator of seal condition in relation to judgment of whether seal condition is good or defective.

Thus, voltage Vs generated in the power supply unit 23 is set according to the attributes of the packaging material 17, the sealing conditions of the sealing device, a sealing method, the structure of a sealing device, and the like.

When, in the equivalent circuit: shown in FIG. 3, Icp and Irp represent current which flows through the capacitor 31 and the internal resistance 32, respectively, at the time of the power supply unit 23 applying voltage Vs of frequency f to the portion F to be inspected, impedance Zc of the capacitor 31 is expressed by $$Zc = 1/(2\pi \cdot f \cdot Cp) \quad (1)$$

Therefore, the current Icp is expressed by $$Icp = Vs/Zc \quad (2)$$

-continued
$$= 2\pi \cdot f \cdot Cp \cdot Vs$$

Then, the capacitance Cp is expressed by $$Cp = Icp/(2\pi \cdot f \cdot Vs) \quad (3)$$

Notably, the voltage Vs serves as applied voltage; the current Icp serves as first inspected-portion current; and the current Irp serves as second inspected-portion current.

Loss factor D, which serves as a second seal condition indicator value indicative of seal condition of the portion F to be inspected, can be expressed by $$D = 1/(2\pi \cdot f \cdot Cp \cdot Rp) \quad (4)$$

Thus, the resistance Rp of the internal resistance 32 is expressed by $$Rp = 1/(2\pi \cdot f \cdot Cp \cdot D) \quad (5)$$

The current Irp flowing through the internal resistance 32 is expressed by $$Irp = Vs/Rp \quad (6)$$

Substituting Eq. (5) into Eq. (6) gives $$Irp = (2\pi \cdot f \cdot Cp \cdot D) \cdot Vs \quad (7)$$

Substituting Eq. (3) into Eq. (7) gives $$Irp = Icp \cdot D$$

Thus, the loss factor D is expressed by $$D = Irp/Icp \quad (8)$$

That is, the loss factor D can be represented by the ratio of the current Icp to the current Irp and thus can be used as an indicator of seal condition in relation to judgment of whether seal condition is good or defective.

The current It flowing through the portion F to be inspected is expressed by $$It = Icp + Irp \quad (9)$$

Since the capacitance Cp can be calculated by Eq. (3), and the loss factor D can be calculated by Eq. (8), the capacitance Cp and the loss factor D can be calculated when the voltage Vs and the currents Icp and Irp are known.

In this case, the capacitor 31 and the internal resistance 32 are equivalently present at the portion F to be inspected and cannot be detected from the outside of the portion F to be inspected.

Thus, on the basis of the current It detected by the current sensor 24, the current Icp and the current Irp are calculated. In this case, as shown in FIG. 5, since the current Irp is a component which flows through the internal resistance 32, the current Irp has the same phase as that of the voltage Vs applied to the portion F to be inspected. Since the current Icp is a component which flows through the capacitor 31, the phase of the current Icp differs 90° from that of the voltage Vs (leads by 90°). Therefore, the current It is sent (in actuality, the current It is converted to voltage Vt, and the voltage Vt is sent) to a phase separation circuit for separating the current It into the current Icp and the current Irp.

Thus, the detection processing section 25 includes an A/D converter 61 which reads the voltage Vs of the power supply unit 23 and performs analog-to-digital conversion on the read the voltage Vs; a current-to-voltage converter 62 which reads the current. It and converts the read It to voltage Vt; an in-phase component detecting section 33 for detecting an in-phase component of the voltage Vt whose phase is the same as that of the voltage Vs; an out-of-phase component detecting section 34 for detecting an out-of-phase component of the voltage Vt whose phase differs from that of the voltage Vs; an A/D converter 35 which reads the in-phase component detected by the in-phase component detecting section 33 and performs analog-to-digital conversion on the read in-phase component; and an A/D converter 36 which reads the out-of-phase component detected by the out-of-phase component detecting section 34 and performs analog-to-digital conversion on the read out-of-phase component. Notably, the in-phase component detecting section 33 and the out-of-phase component detecting section 34 constitute the phase separation circuit, which serves as the phase separating section.

Thus, the voltage Vs in the form of a digital signal can be output from the A/D converter 61; the current Irp in the form of a digital signal can be output from the A/D converter 35; and the current Icp in the form of a digital signal can be output from the A/D converter 36. The output voltage Vs and currents Icp and Irp are sent to the control section 26. Notably, the A/D converter 61 serves as the applied-voltage detecting section; the out-of-phase detecting section 34 and the A/D converter 36 constitute the first inspected-portion current detecting section; and the in-phase detecting section 33 and the A/D converter 35 constitute the second inspected-portion current detecting section.

The control section 26 reads the frequency f set in the power supply unit 23, the voltage Vs, and the currents Icp and Irp. Subsequently, unillustrated capacitance calculation processing means of the control section 26 performs capacitance calculation processing in which the capacitance Cp is calculated by Eq. (3). Unillustrated loss factor calculation processing means of the control section 26 performs loss factor calculation processing in which the loss factor D is calculated by Eq. (8). Notably, the capacitance calculation processing means and the loss factor calculation processing means constitute the seal condition indicator value calculation processing means. The seal condition indicator value calculation processing means performs seal condition indicator value calculation processing in which the capacitance Cp and the loss factor D are calculated.

The storage unit 29 retains, in the form of a table, reference capacitors Cpref and reference loss factors Dref which are calculated beforehand on the basis of attributes of the packaging material 17, sealing conditions and methods of sealing devices, and structures of sealing devices, in such a manner that a reference capacitor Cpref and a reference loss factor Dref are provided for each of combinations among types of the packaging material 17, sealing conditions, sealing methods, and sealing devices.

Unillustrated first seal condition judgment processing means of the control section 26 performs first seal condition judgment processing in which the first seal condition judgment processing means references the above-mentioned table, compares a reference capacitance Cpref and the capacitance Cp calculated by the capacitance calculation processing means, and judges whether or not a deviation $\Delta Cp$ as calculated below is equal to or less than a threshold value Cpth.

$$\Delta Cp = |Cp - Cpref|$$

When the deviation $\Delta Cp$ is equal to or less than the threshold value Cpth, the first seal condition judgment processing means judges that seal condition is good. When the deviation $\Delta Cp$ is greater than the threshold value Cpth, the first seal condition judgment processing means judges that seal condition is defective. In this manner, the first seal condition judgment processing means can judge whether seal condition is good or defective.

Unillustrated second seal condition judgment processing means of the control section 26 performs second seal condition judgment processing in which the second seal condition judgment processing means references the above-mentioned table, compares a reference loss factor Dref and the loss factor D calculated by the loss factor calculation processing means, and judges whether or not a deviation $\Delta D$ as calculated below is equal to or less than a threshold value Dth.

$$\Delta D = |D - Dref|$$

When the deviation $\Delta D$ is equal to or less than the threshold value Dth, the second seal condition judgment processing means judges that seal condition is good. When the deviation $\Delta D$ is greater than the threshold value Dth, the second seal condition judgment processing means judges that seal condition is defective. In this manner, the second seal condition judgment processing means can judge whether seal condition is good or defective.

As described above, on the basis of the current It which flows through the portion F to be inspected when the voltage Vs is applied to the portion F to be inspected, a judgment is made as to whether seal condition is good or defective. Thus, occurrence of a seal defect can be judged without involvement of an operator's subjectivity, whereby seal condition can be reliably inspected.

In the present embodiment, the judgement as to whether seal condition is good or defective is performed in each of the first seal condition judgment processing and the second seal condition judgment processing. However, the judgement as to whether seal condition is good or defective may be performed on the basis of processing results of the first seal condition judgment processing and the second seal condition judgment processing.

The present invention is not limited to the above-described embodiment. Numerous modifications and variations of the present invention are possible in light of the spirit of the present invention, and they are not excluded from the scope of the present invention.

INDUSTRIAL APPLICABILITY

The present invention can be applied to a seal condition inspection apparatus for inspecting a packaging container for seal condition.

The invention claimed is:

1. A seal condition inspection apparatus for inspecting a seal between two superimposed portions of a packaging material, the apparatus comprising:

a pair of opposing electrodes spaced apart a distance d and disposed on opposing sides of a seal portion for pressing, with a predetermined pressure, the seal therebetween;

a power supply unit, through which the electrodes are connected, for passing a current through a portion of the seal between the electrodes;

electrically variable-quantity detection means for detecting an electrically variable quantity of the seal at a portion between the opposing electrodes, said variable quantity varying as a function of distance d, to be inspected for seal condition;

seal condition indicator value calculation processing means for calculating, on the basis of the detected electrically variable quantity, a seal condition indicator value indicative of seal condition of the inspected seal portion; and seal condition judgment processing means for judging from the seal condition indicator value whether seal condition is good or defective.

2. The seal condition inspection apparatus of claim 1, wherein the seal condition indicator value is the capacitance of the inspected seal portion.

3. The seal condition inspection apparatus of claim 1, wherein the seal condition indicator value is the loss factor of the inspected seal portion.

4. The seal condition inspection apparatus of claim 1, wherein the seal condition indicator value is the capacitance and loss factor of the inspected seal portion.

5. The seal condition inspection apparatus of claim 1, wherein the electrically variable quantity is voltage applied to the inspected seal portion and current flowing through the inspected seal portion.

6. The seal condition inspection apparatus of claim 5, further comprising a phase separating section for detecting, on the basis of current flowing through the inspected seal portion, an in-phase component having the same phase as that of voltage applied to the inspected seal portion, and an out-of-phase component having a phase different from that of voltage applied to the inspected seal portion.

7. A seal condition inspection method for inspecting a seal between two super-imposed portions of a packaging material, the method comprising:

pressing the seal with a predetermined pressure between two opposing electrodes with the electrodes spaced apart a distance d at the predetermined pressure, the distance d varying with seal condition;

passing a current through a portion of the seal between the electrodes;

detecting an electrically variable quantity of the seal portion, between the opposing electrodes, as a function of distance d;

calculating, on the basis of the detected electrically variable quantity, a seal condition indicator value, indicative of seal condition of the inspected seal portion; and judging from the seal condition indicator value whether the seal condition is good or defective.

8. The seal condition inspection method according to claim 7 further comprising:

passing a filled packaging material along a linear feed path through a sealing device;

forming transverse seals perpendicular to the linear heat path, utilizing the sealing device and wherein the inspected seal portion is a portion of a transverse seal.

* * * * *